US010785185B2

(12) United States Patent
Vennam et al.

(10) Patent No.: US 10,785,185 B2
(45) Date of Patent: Sep. 22, 2020

(54) AUTOMATED SUMMARY OF DIGITAL GROUP CONVERSATIONS

(71) Applicant: International Business Machines Corporation, Armonk, NY (US)

(72) Inventors: Ramratan Vennam, Austin, TX (US); Belinda M. Vennam, Austin, TX (US); Spencer T. Reynolds, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/007,475

(22) Filed: Jun. 13, 2018

(65) Prior Publication Data

US 2019/0386949 A1 Dec. 19, 2019

(51) Int. Cl.

| | |
|---|---|
| ***H04L 12/58*** | (2006.01) |
| ***H04L 29/06*** | (2006.01) |
| ***G06F 16/33*** | (2019.01) |
| ***G06F 40/205*** | (2020.01) |

(52) U.S. Cl.

CPC ............ *H04L 51/36* (2013.01); *G06F 16/334* (2019.01); *G06F 40/205* (2020.01); *H04L 51/16* (2013.01); *H04L 51/22* (2013.01); *H04L 65/403* (2013.01)

(58) Field of Classification Search

CPC ......... H04L 51/16; H04L 51/22; H04L 51/36; H04L 65/403; G06F 16/334; G06F 17/2705

See application file for complete search history.

(56) References Cited

U.S. PATENT DOCUMENTS

| | | | | |
|---|---|---|---|---|
| 9,116,984 | B2 | 8/2015 | Caldwell et al. | |
| 9,547,832 | B2 * | 1/2017 | Gordon | G06Q 30/02 |
| 10,361,981 | B2 * | 7/2019 | Bennett | G06Q 10/10 |
| 2005/0033615 | A1 * | 2/2005 | Nguyen | G06Q 10/02 705/5 |

(Continued)

OTHER PUBLICATIONS

Mcdowell et al., "Semantic Email", WWW2004, May 17-22, 2004, ACM 2004, New York, NY, USA, pp. 244-254.

(Continued)

*Primary Examiner* — John M Macilwinen

(74) *Attorney, Agent, or Firm* — Scully, Scott, Murphy & Presser, P.C.; Alexander Jochym, Esq.

(57) ABSTRACT

A system, method and program product for categorizing, analyzing, and continually aggregating unstructured communication data in the form of a query and responses. The method initially categorizes the conversation thread as a query and then uses natural language understanding technologies to start analyzing and extracting entities, sentiment and keywords. It then categorizes and aggregates those responses accordingly, providing the user with a continuously updated summary. The method groups the responses into Positive/Affirmative and Negative. The system can also determine conversations that need further action or response from the organizer by categorizing more complex individual responses that contain questions or action items. The method further analyzes an e-mail thread to identify a certain type of conversation, e.g., an RSVP/Poll, collect multiple responses, analyze the responses and tally up the results to create a summary that may be communicated back to the group thread originator according to a preferred messaging modality.

12 Claims, 9 Drawing Sheets

500

505 RECEIVE CURRENT AND HISTORICAL DATA OF A PAST USER CONVERSATION THREADS REQUESTING A POLL RESPONSE

510 USE SUPERVISED MACHINE LEARNING TECHNIQUE TO TRAIN MODEL TO CORRELATE MESSAGE ENTITIES AND KEY WORDS AND SENTIMENT WITH A RESPECTIVE INTENT (POSITIVE OR NEGATIVE) OUTCOMES

515 USE SUPERVISED LEARNING TO TRAIN MODEL TO CORRELATE MESSAGE ENTITIES AND KEY WORDS AND SENTIMENT WITH AN ACTION OUTCOME(S)

520 STORE UPDATED MODEL FOR ACCESS BY SYSTEM

(56) References Cited

U.S. PATENT DOCUMENTS

| | | | | |
|---|---|---|---|---|
| 2014/0164525 | A1* | 6/2014 | Malik | H04L 51/32 709/206 |
| 2014/0172427 | A1 | 6/2014 | Liu et al. | |
| 2017/0124038 | A1 | 5/2017 | Upadhyay et al. | |
| 2017/0351385 | A1 | 12/2017 | Ertmann et al. | |
| 2019/0140996 | A1* | 5/2019 | Silberstein | G06F 16/951 |

OTHER PUBLICATIONS

Cselle et al., "BussTrack: Topic Detection and Tracking in Email", IUI'07, Jan. 28, 31, 2007, Honolulu, Hawaii, USA, ACM 2007, 8 pages.

Shrestha et al., "Using Question-Answer Pairs in Extractive Summarization of Email Conversations", Computational Linguistics and Intelligent Text Processing. CICLing 2007. 8th International Conference, CICLing 2007, Mexico City, Mexico, Feb. 18-24, 2007. Proceedings, Lecture Notes in Computer Science, vol. 4394. Springer, Berlin, Heidelberg, pp. 542-550.

Anonymous, "A smart method/system to get key points of email with long history", IP.com, IPCOM000246941D, Jul. 18, 2016, 8 pages.

* cited by examiner

AUTOMATED SUMMARY OF DIGITAL GROUP CONVERSATIONS

FIELD

Embodiments of the present invention generally relate to a cognitive method and computer system for providing a summary of content provided in a plurality of digital communications, and more particularly, computer system functionality for receiving digital communications from plural users responsive to an initial query and providing a single summary of the aggregate sentiment of plural responses to that query.

BACKGROUND

Current collaboration tools and services such as Slack® (registered trademark of Slack Technologies, Inc.) provide software for use in group communication, e.g., namely, postings, memoranda and instant messaging, file sharing, calendar synchronization, and automated integrations with external service providers. Such tools enabling group collaboration allow communities, groups, or teams to join through a specific URL or invitation sent by a team administrator or organizer.

SUMMARY

A system, method and computer program product is provided that performs cognitive ability to summarize a digital group conversation thread.

In one embodiment, the system, method and computer program product performs categorizing, analyzing, and then continually aggregating unstructured communication data in the form of a query and responses.

According to one aspect of the present invention, there is provided a computer-implemented method for summarizing information related to an event. The method comprises: receiving, at a hardware processor of a computer system, a textual input associated with a users' message communicated over a network; implementing, using the hardware processor of the computer system, a natural language processing of the textual content for classifying a received user's message as an initial event invitation query, the event invitation including a question requiring an answer from plural second users recipients; implementing using the hardware processor of the computer system, the natural language processing technique for automatically identifying keywords in each reply message received from plural second users, and classifying the messages having the keywords as indicating one of: whether a second user is attending or not attending the event; aggregating, using the hardware processor of the computer system, the indicated responses to automatically determine a number of recipients who will attend, and a number of recipients who will not attend; automatically generating an output summary message comprising: a total number of replies from second users indicating attending the event including identification of the second user indicating they will attend; and a total number of replies from second users indicating they will not attend the event including identification of the second users indicating they will not attend; and automatically communicating the generated output summary to a device associated with the first user over a communications network.

In another aspect of the present invention, there is provided a computer-implemented system. The system includes: a memory storage device; and a hardware processor coupled to the memory storage device and configured to perform a method to: receive a textual input associated with a users' message communicated over a network; implement a natural language processing of the textual content for classifying a received user's message as an initial event invitation query, the event invitation including a question requiring an answer from plural second users recipients; implement the natural language processing technique for automatically identifying keywords in each reply message received from plural second users, and classifying the messages having the keywords as indicating one of: whether a second user is attending or not attending the event; aggregate the indicated responses to automatically determine a number of recipients who will attend, and a number of recipients who will not attend; automatically generate an output summary message comprising: a total number of replies from second users indicating attending the event including identification of the second user indicating they will attend; and a total number of replies from second users indicating they will not attend the event including identification of the second users indicating they will not attend; and automatically communicate the generated output summary to a device associated with the first user over a communications network.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In one aspect, a system and method are provided to leverage cognitive abilities for a computer system to generate and provide a single summary of content provided in a plurality of digital communications. The communications may be any threaded conversation messaging system, e.g., e-mail, instant messaging, text messaging, group messaging or group threaded communications.

Particularly, the computer system runs methods providing it with the ability to summarize the content in lengthy worded email threads of multiple users in response to a question and multi-user-answer style of communication. For example, oftentimes, an organizer of a recurring event, such as a weekly kickball game, will need to determine attendance for a specific instance of that event from the various potential attendees or team members. To poll for attendance, the organizer will send an email or a text to the members (invitees) asking everyone to let him or her know whether or not they're planning to attend. The result is a large set of one or two line responses such as "I'm in," or "I can't make it." Responses could also be more complex, such as "I would love to, but unfortunately my car broke down last week. Could someone pick me up?"

In a more complex use case, the organizer may request additional information along with attendance, e.g., "Who is coming to the Thanksgiving potluck and what are you bringing?" In this case, the organizer is now interested in the attendees as well as the food each person is bringing.

The computer system, in one embodiment, is provided with a cognitive ability to automatically aggregate these responses including generating a summary of the positive or negative responses of invitees, any action items that is requested (e.g., needing a car pick-up) and any additional items or entities invitees may plan to bring (e.g., bringing food or children). Using the methods herein, these entities or items may be automatically categorized (e.g., food) and provided as a list of the invitees and the items they indicated in their response that they will bring.

Figure 1:
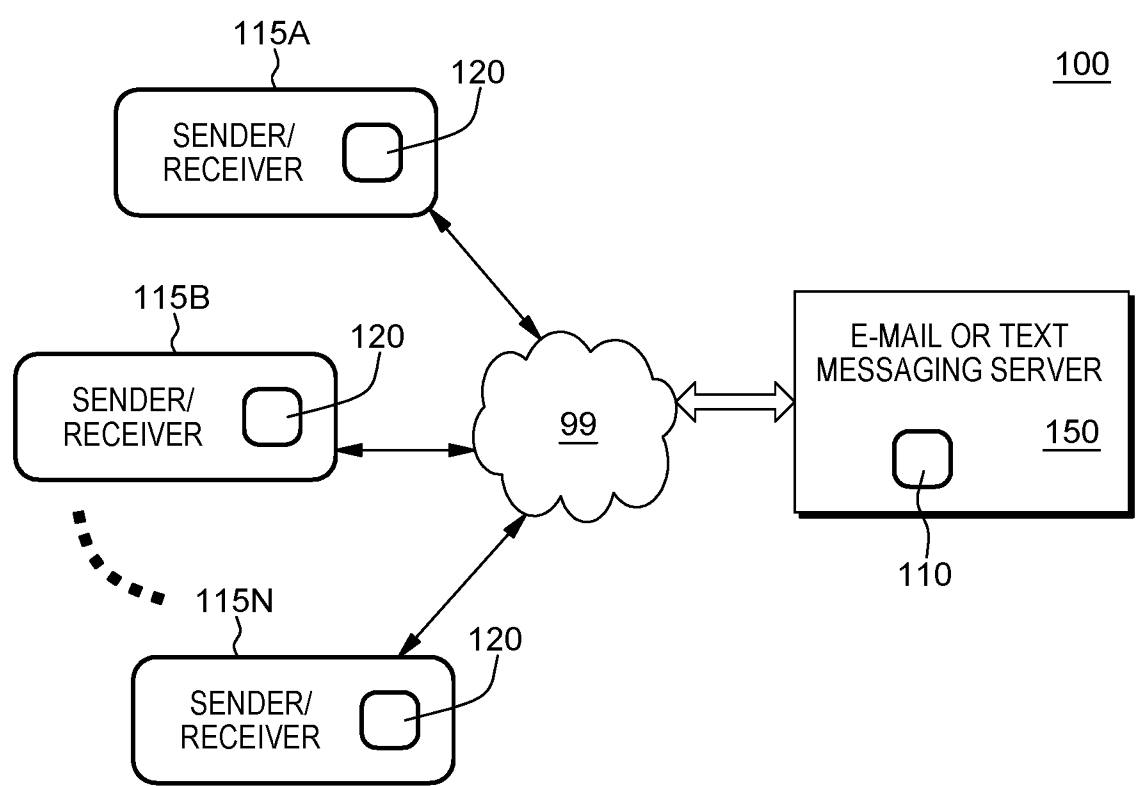
FIG. 1 shows a non-limiting example embodiment of a client-server-based messaging system architecture in which the principles of the present invention are employed.

FIG. 1 conceptually depicts a communications system architecture 100 employing a system and methods for categorizing, analyzing, and then continually aggregating unstructured communication data in electronic documents (which may be any type of electronic message such as e-mail, converted voice, text, SMS, IM, chat messaging, fax or pager message or other type of electronic document) in the form of a query and responses. System architecture 100 includes computing devices employing a wide range of communication technologies that are configured to enable multiple users (e.g., 2 or more users) to conduct and participate in message communication threads. Communications may be commonly performed using various messaging services including but not limited to: e-mail messaging service, an Instant Messaging (IM) for allowing a user to send and receive messages nearly instantaneously with other IM service users over a network or collection of networks, such as the Internet, and a Short Message Service (SMS) service that enables users to exchange short text messages over a communication network. SMS is available on most mobile phones, some personal digital assistants and computers (typically via internet sites providing SMS services).

In particular, FIG. 1 shows a non-limiting example embodiment of a client/server-based messaging system architecture 100. For example, user devices 115A, 115B, . . . , 115N may function as SMS message receiver units, message sender units, etc. and equipped with an SMS instant messaging client 120 adapted for enabling users to compose, send, retrieve, and view IM or text messages over an messaging platform such as, but not limited to: IBM Sametime®, iMessage®, Skype®, Yahoo! ® Messenger, WeChat®, eBuddy®, or any other consumer-based or enterprise-based instant messaging system.

Similarly, user devices 115A, 115B, . . . 115N may function as e-mail message receiver units, e-mail message sender units, etc. and equipped with an e-mail messaging client 120 adapted for enabling users to compose, send, retrieve, and view a e-mail messages. For example, service center network element 110 at a host server 150 of FIG. 1 operates methods for receiving an e-mail message(s) from a first user sender device(s) over a communications network and re-transmitting the message over a network to other receiver communication devices associated with second users (message recipients).

In one embodiment, as shown, each user, via a respective device 115A, . . . 115N, may use the client 120 for connecting with service center network element 110 at corporate email server running, e.g., IBM Lotus Notes® which is a proprietary internal enterprise email format, or with a cloud-based set of team collaboration tools and services, such as SLACK® ("Searchable Log of All Conversation and Knowledge"). Other web-based or cloud-based email clients 120 that enable communications that are processed in one aspect of the invention, may include but are not limited to: AOL, Microsoft Skype Teams, Mail, Gmail, Outlook.com, Hotmail and Yahoo! Mail, etc. In web-based e-mail systems, messages may be exchanged between host servers using the Simple Mail Transfer Protocol with software programs called mail transfer agents (not shown). The client devices 115A, . . . , 115N in one embodiment may thus communicate with the email server using a vendor-specific, proprietary protocol, or alternatively, any other public or open source e-mail messaging protocol may be used for the e-mail communications.

The host e-mail messaging service center element may be a computer server 150 that sends or receives email via the Internet through an Internet mail gateway and also performs any necessary reformatting. If first and second users work for the same company, the entire e-mail transaction may happen completely within a single corporate email system.

Figure 2:
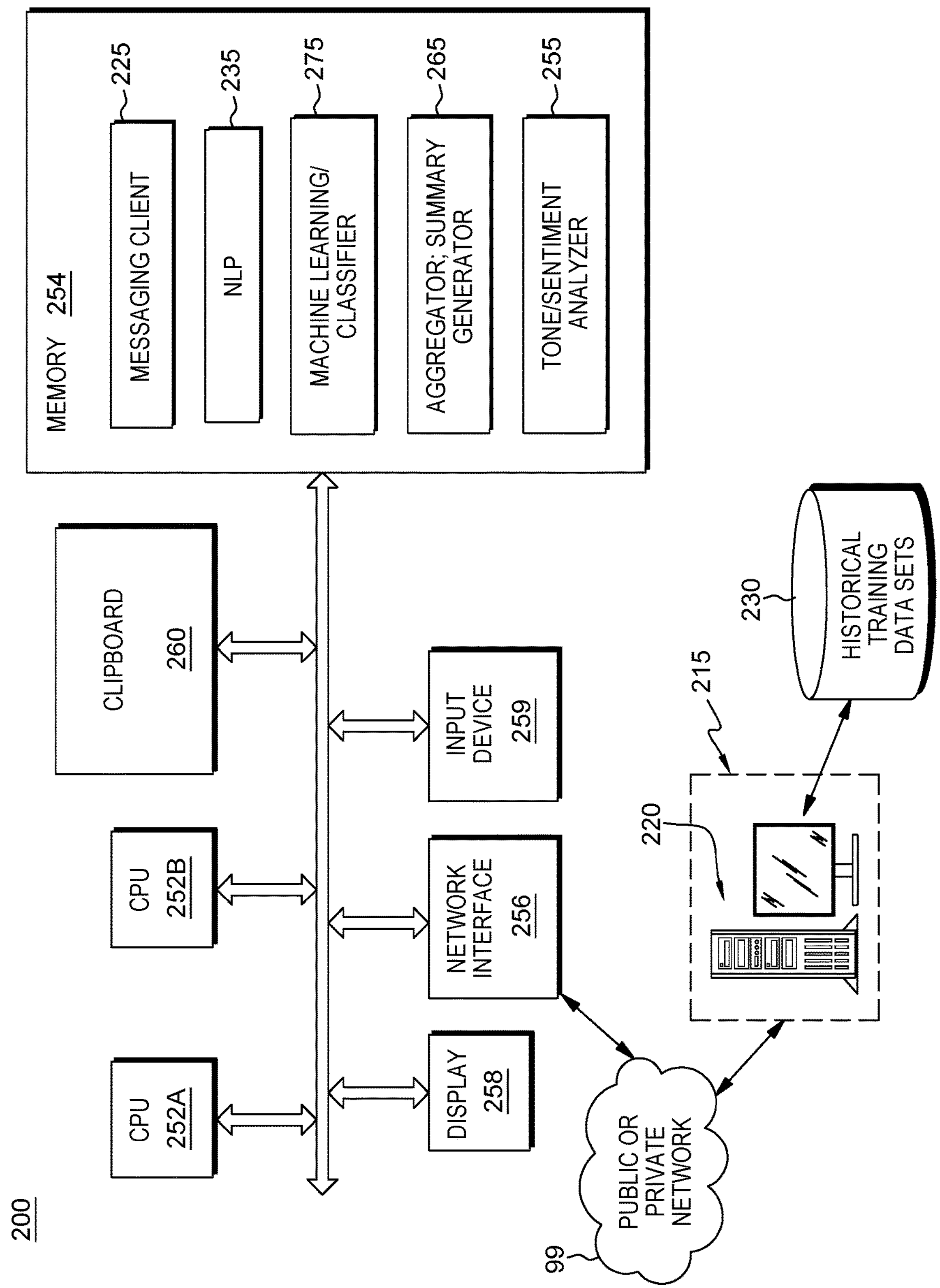
FIG. 2 depicts a computer system providing the ability for generating a digital group conversation summary according to one embodiment.

Referring now to FIG. 2, there is depicted a computer system 200 providing the ability for digital group conversation summary. In some aspects, system 200 may include a computing device, a mobile device, or a server such as server 150 such as shown in FIG. 1. In some aspects, computing device 200 may include, for example, personal computers, laptops, tablets, smart devices, smart phones, or any other similar computing device.

Computing system 200 includes one or more hardware processors 252A, 252B, a memory 254, e.g., for storing an operating system and program instructions, a network interface 256, a display device 258, an input device 259, and any other features common to a computing device. In some aspects, computing system 200 may, for example, be any computing device that is configured to communicate with a web-site 215 or web- or cloud-based server 220 over a public or private communications network 99. Further, as shown as part of system 200, historical data sets including training data that captures user's responses and conversation message reply keywords and entities and/or running lists of respondents and their responses may stored locally in an attached memory storage device 260, e.g., a clipboard memory, or stored in an attached, or a remote memory storage device 230, e.g., a database, and accessed via a remote network connection for input to the system 200.

In the embodiment depicted in FIG. 2, processors 252A, 252B may include, for example, a microcontroller, Field Programmable Gate Array (FPGA), or any other processor that is configured to perform various operations. Processors 252A, 252B may be configured to execute instructions as described below. These instructions may be stored, for example, as programmed modules in memory storage device 254.

Memory 254 may include, for example, non-transitory computer readable media in the form of volatile memory, such as random access memory (RAM) and/or cache memory or others. Memory 254 may include, for example, other removable/non-removable, volatile/non-volatile storage media. By way of non-limiting examples only, memory 354 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 256 is configured to transmit and receive data or information to and from a web-site server 220, e.g., via wired or wireless connections. For example, network interface 256 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 200 to transmit information to or receive information from the server 220.

Display 258 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 358 may include a liquid crystal display (LCD), an e-paper/e-ink display, an organic LED (OLED) display, or other similar display technologies. In some aspects, display 358 may be touch-sensitive and may also function as an input device.

Input device 259 may include, for example, a keyboard, a mouse, a touch-sensitive display, a keypad, a microphone, or other similar input devices or any other input devices that may be used alone or together to provide a user with the capability to interact with the computing device 200.

With respect to the ability of computer system 200 for performing automated digital group conversation summaries, the memory 260 may be configured for storing historical respondent reply message sets and corresponding message responses seed data that are used to train and generate the supervised classification model. As mentioned, this memory 260 may be local to the computer or mobile device system 200, or otherwise, embodied as a database 260 associated with the remote server 220, over a network.

Computer system 200 is further equipped with a memory 254 storing processing modules that include programmed instructions adapted to invoke operations for analyzing messages communicated over the system 100 by the multiple users. That is, processing modules include programmed instructions adapted to invoke operations for analyzing the e-mail, chat, text, IM, messaging communicated amongst the multiple users and performing natural language processing analysis and aggregating functions for determining results of a question or poll asked from a conversation thread or communication channel amongst users and automating summary generation according to embodiments herein. SLACK® provides persistent chat rooms (communication channels). More generally, communication channel refers to the mode or means for information to flow within a group of users.

In one embodiment, one of the programmed processing modules stored at the associated server memory 254 include messaging client module 225 that when run, e.g., by a processor at server 150, configures the system to invoke operations for providing application program interfaces and the messaging communications service functionality, e.g., e-mail, chat, IM, SMS, SLACK®, etc. and establishing messaging (i.e., sending and receiving) of messages over a network amongst one or multiple users via their computing or mobile devices 115A, 115B, . . . , 115N etc.

As shown in FIG. 2, in one embodiment, one of the programmed processing modules stored at the associated server memory 254 include a natural language processor (NLP) 235 that, when run by a processor at server 245, configures the system to invoke natural language classification of the electronic document. In particular, NLP 235 invokes operations for receiving and semantic processing of text messages from each of multiple users partaking in a conversation thread and classifying the user's natural language response message. The natural language classification may be performed using tools such as, e.g., IBM Watson® and Microsoft Azure® the implements Natural Language Understanding application program interfaces (APIs). In an embodiment, upon receiving the text message, e.g., from a first user, the NLP parsing the text and extracting one or more entities and keywords that may be analyzed for identifying whether the message includes a query or is a query beginning a conversation thread, and further analyzes messages from second users and extracting one or more entities, keywords and sentiment that is analyzed for identifying whether the message is a response to that query that is associated with the conversation thread.

As part of the analysis conducted, in one embodiment, the module 235 uses natural language parsing and classification techniques to identify the start of an email thread as a question, and then analyze each reply received from other users as positive or negative. Concurrently, module 235 runs instructions for identifying entities in the received message and extracting those entities. These extracted entities are used for generating a polling summary.

In one embodiment, the natural language classifier module 235 employs a classification model that is continuously trained and updated to correlate user's textual responses with outcome classifications (i.e., positive (affirmative) or negative (rejected)) or classification as a query. The natural language classifier system model may be trained with seed data such as historic e-mails messages and text messages from users and outcome classifications data (positive, negative or a query) to build the model.

In one embodiment, the NLP may specifically perform semantic text analysis, including sentiment analysis. Operating in conjunction with the NLP, in one embodiment, one of the programmed processing modules stored at the associated server memory 254 include a sentiment analyzer 255 that when run by a processor at server 150, configures the system to invoke operations for determining a tone of the user's reply message and extract sentiment from the responsive text message which is used to determine that respondent's positive or negative response.

For example, server 150 may run operations employing an artificial intelligence tool such as a tone and sentiment analyzer 245 and may include International Business Machine's (IBM's) Watson® Tone Analyzer which may be employed to infer the user's tone, i.e., sentiment or emotion, e.g., based on that user's received digital communications, e.g., email or text messages, When running tone and sentiment analyzer 155, the system 100 is able to determine an emotional content for use in determining whether a particular user response to the query associated with the conversation thread is an affirmative or a negative.

In a non-limiting example, IBM's Watson® Tone Analyzer service uses linguistic analysis to detect emotional and language tones in written text that will correspond to one of: an affirmative response or a negative response. The module 155 thus may employ the IBM Watson® Tone Analyzer service to analyze tone of the individual user messages in the conversation thread and report the tone of the received input(s) as a representative score indicative or an affirmative response or negative response.

In one embodiment, module 255 may employ an artificial intelligence tool such as IBM Watson's® AlchemyAPI® and invoke machine learning operations, e.g., to perform natural language processing and specifically, semantic text analysis, including sentiment analysis.

In a further embodiment, a supervised learning module 275 is further provided to invoke instructions for running supervised learning techniques including the implementation of a learning algorithm for building a classification model. Such functionality may include implementing functions for receiving and ingesting data corresponding to user text messages and/or extracted key words and for inputting the training feature data including whether the associated key words indicated an affirmative reply or a negative reply or a reply requiring or requesting a further action to be taken, e.g., by the responder or the originator. Thus, using a supervised learning algorithm, a classification model is built including functionality for classifying extracted keywords into an affirmative response or a negative response and/or whether a further action is required.

Thus, in one aspect, users' previous responses or replies to an originator poll or query with affirmative or negative reply classifications could be stored and analyzed along with the persons who sent the responses. Over the time, the system learns to associate certain response keywords or message formats for particular users and automatically can categorize the response for the summary. Models generated using the supervised learning enable continuous determining of reply messages categorization of responses in the affirmative, the negative and/or whether or not a further action is required.

Figure 5:
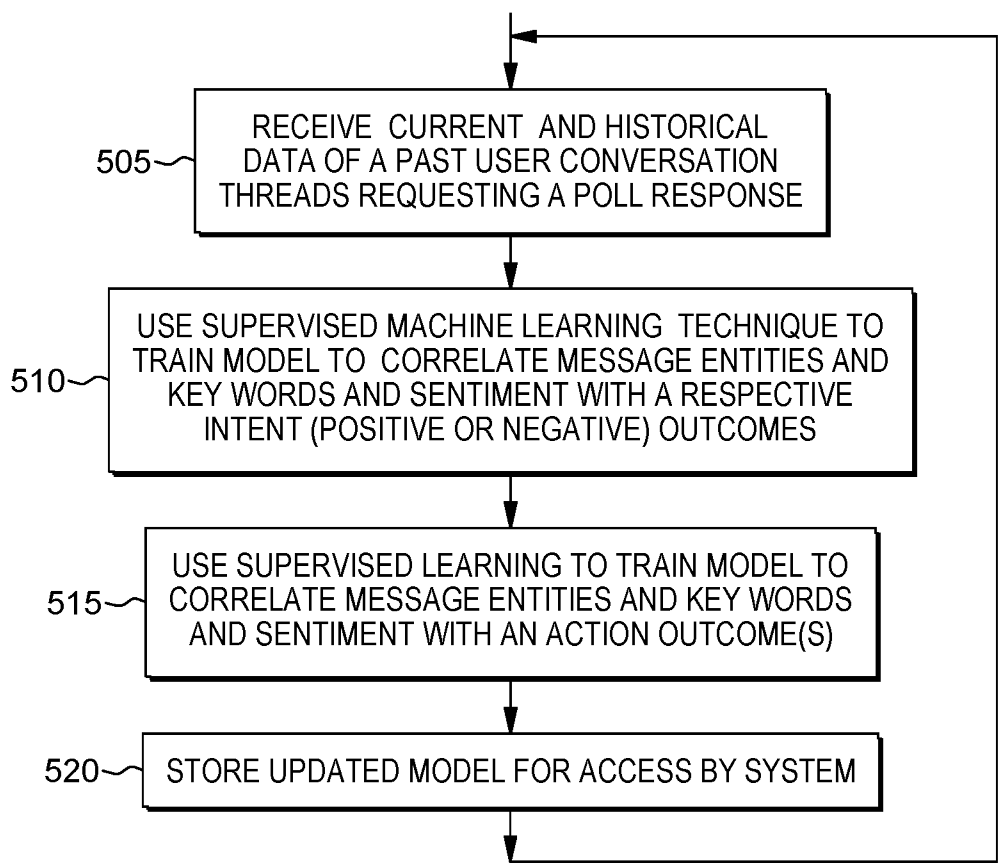
FIG. 5 depicts an embodiment of a method to generate and continually revise the natural language classification model based on keywords and entities extracted from group conversation response messages and corresponding training (positive or negative) response outcomes.

FIG. 5 depicts an embodiment of a method 500 run by the NLP supervised learning classification module 275 to generate and continually revise types of response messages and related response outputs, e.g., affirmative, negative or an action requirement based on conversation messaging "polls" generated by originating senders.

As shown in FIG. 5, step 505, the system 100 receives historical and current data of a past user or current user conversation thread queries or polls and associated response messages. In particular, data associated with the past group conversation threads are received as input to a machine learning model. At 510, a supervised machine learning technique is implemented to build a machine learned model for correlating entities and key words and sentiment associated with respective conversation respondent messages with a respective outcome (e.g., affirmative or negative) as responded to by past/current end users. At 515, the model is further trained to recognize from past entities, keywords and sentiment of respondent messages any action outcomes as provided in past/current respondents' messages. At 520, the updated model is stored in system memory for later access by system 100 in implementing methods of FIGS. 3A-3B.

In one embodiment, as shown in FIG. 2, one of the programmed processing modules stored at the associated server memory 254 include a categorizer, aggregator and summary generator 265 that when run by a processor at server 150, configures the system to invoke operations for continually aggregating the unstructured communication data in the form of a query and responses in a group messaging thread, categorizing and aggregating the responses accordingly, and providing the first user (or originator) with a continuously updated digital summary. More particularly, operations are first performed for identifying summarizable polls from conversation threads. After this identification, it will provide an originator of the "poll" or "question" message (e.g., email) with a constantly updated summary based on incoming responses.

Initially aggregator and summary generator 265 categorizes an initial message from a conversation thread and treats this as an initial query or a poll, and then builds a summarization of the responses, constantly updating that summarization for the user. An output is provided to the originator (initial sender) enabling the originator to read a summary of all responses without reading each received response message.

As part of this action, based on the categorized responses to an initial query, aggregator and summary generator 265 further determines those responses that need additional action. The ultimate summary generated for the originator includes a list of one or more actions required from the responses for a summarization view for the user.

FIG. 3 depicts a method run at the server 150 for categorizing, analyzing, and then continually aggregating unstructured communication data in the form of a query and multiple responses. The communication data is, in one embodiment, e-mail messages, however, the methods herein are applicable to any type of messaging modality, e.g., text messaging, IM, SMS, SLACK®, etc.

At FIG. 3, step 302, a first step is the system server 150 detecting receipt of a message communicated by a user via a user's device, e.g., device 115A, 115B, . . . , 115N. In one embodiment, the received message may be from a first user or originator, via a computing device, that may be in initiating the group thread by sending a query to multiple recipients/respondents. The query may be related to an event and the multiple recipients may be invitees or attendees who need to respond, such as by r.s.v.p. Further, the received message may be a reply message associated with a particular group conversation thread with unstructured textual content received from other user devices over the network. The textual content may be interpreted to indicate whether it is affirmative (positive) or a decline (negative) response.

In one embodiment, a natural language processor module may be invoked at 305 to determine the sender of the message, and parse and interpret the textual message content. At 308, based on the message content, a determination is made as to whether the message is an initial query (e.g., an invitation to attend an event) directed to multiple user addresses, i.e., a first query sent to multiple invitees. As the invitees respond to the query, a conversation thread results among the multiple respondents. If, at 308, it is determined that the received message is an initial query, then the process proceeds to 310, FIG. 3A where the system records the query and all the respondents indicated in the received message associated with the query and conversation thread. The system then returns to 302 to wait for response messages from the respondents.

Returning back to 308, if it determined that the received message is not an initial query, then the process proceeds to 320, where a determination is made whether the received message is a response to the initial query of the conversation thread, e.g., from one of the respondents. In one embodiment, it may first be determined from the message subject line, or the sender and recipient(s) combination of metadata to which conversation group thread the incoming message belongs to.

If the received message is not a response to the initial query nor from a party to the conversation thread, then the process may take another action or no action and return to 302 to await receipt of further messages. Otherwise, at 320, FIG. 3A, if it is determined that the received message is associated with or responsive to the initial query of the conversation thread, then the process proceeds to step 325, FIG. 3B.

After the system initially categorizes the conversation thread as a query it will then invoke the natural language understanding technologies to start analyzing and extracting entities, sentiment and keywords. It will then categorize and aggregate those responses accordingly, to provide the user with a continuously updated summary.

Figure 3A:
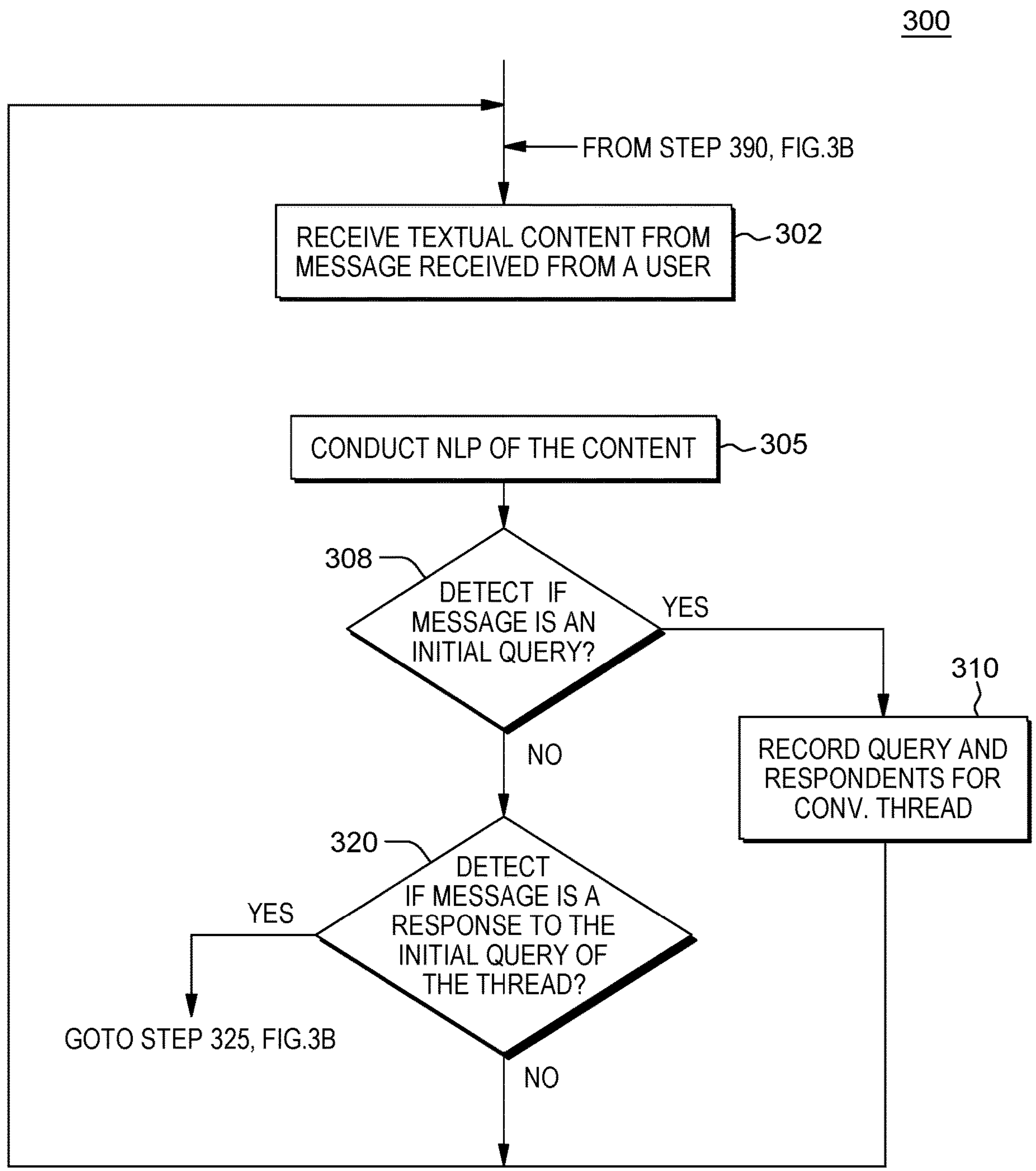
FIGS. 3A-3B depict a method run at the computer system for performing digital group conversation summary operations according to one embodiment.
Figure 3B:
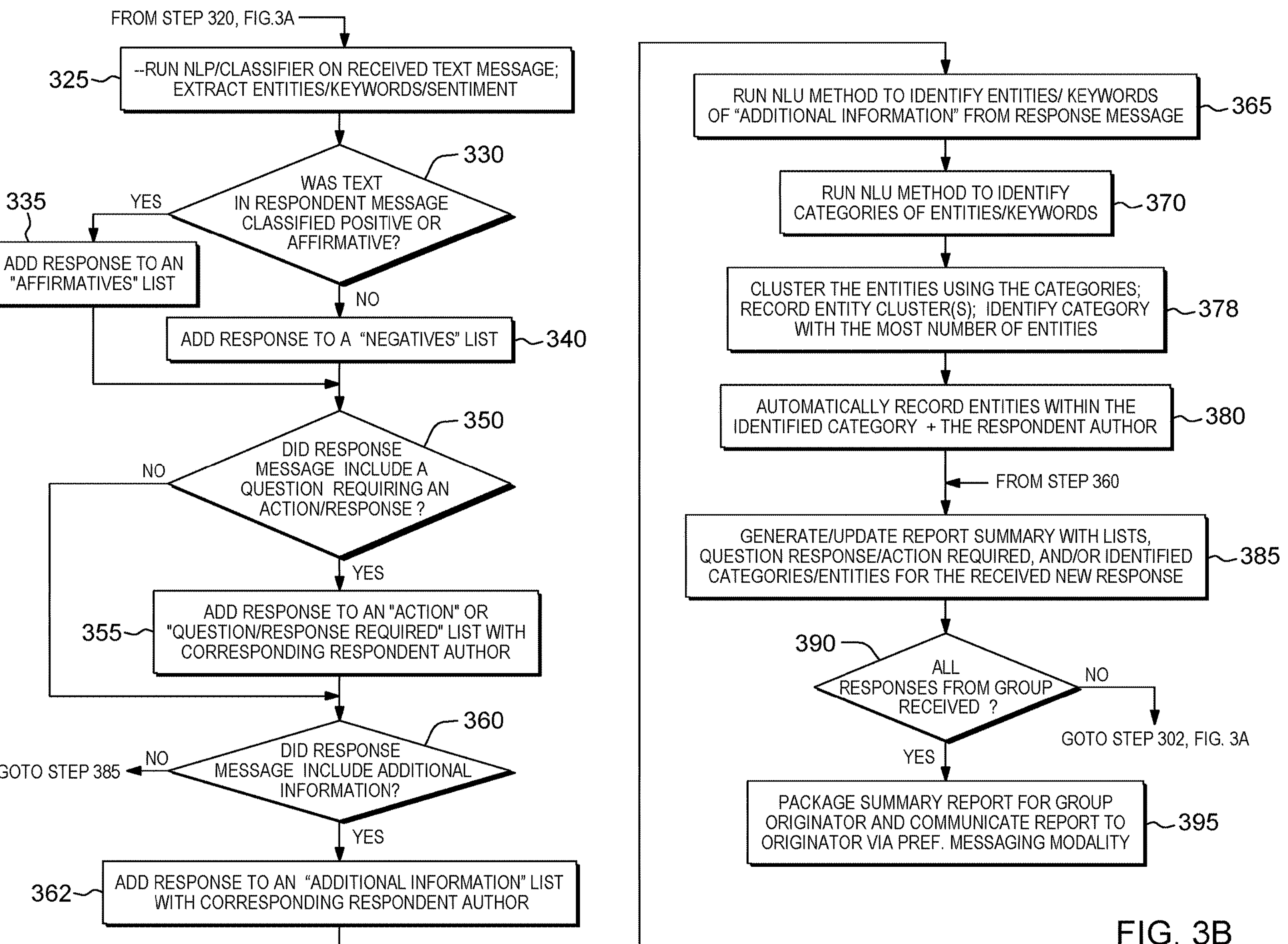

Thus, continuing at 325, FIG. 3B, having received a respondents reply to the originating query, the natural language processor and classifier model are invoked to analyze the received text message and extract any entities, keywords or determine a response sentiment. Based on the NLP analysis and any identified entities, keywords or response sentiment, the response is classified as affirmative or negative. As the system groups the responses into Positive/Affirmative and Negative, then continuing at 330, FIG. 3B, a determination is then made as to whether the text in respondent message has been classified as a positive or affirmative response to the initial query. If it is determined at 330 that this respondent's message response is affirmative, then the respondent is added to an "affirmatives" list that keeps track of the positive or affirmative responses by recipients of the group conversation thread. Otherwise, if it is determined at 330 that this respondent's response is negative, then at 340, that respondent is added to a "negatives" list that keeps track of the negative or "rejection" responses by the recipients of the group conversation thread. Whether added to the "affirmatives" list at 335 or the "negatives" list at 340, the process proceeds to 350 where, based on the NLP analysis and classification analysis, a determination is made at 345 as to whether the respondent's received message included a question or requires an action on the part of the respondent or originator.

As an example, the system may determine conversations that need further action or response from the organizer by categorizing more complex individual responses that contain questions or action items such as, "Can you tell me when the game is, again?", or "My car is broken down, I can go if someone could pick me up."

At 350, FIG. 3B, a determination is made as to whether, based on the NLP analysis and classification analysis, the received message included a question requiring an action and/or response (e.g., "Can you pick me up?"). If, at 350, it is determined that the respondent's message does not include a question requiring an action or response, then the process advances to step 360. Otherwise, at 350, if the message does include a questions requiring an action/response, then the process proceeds to step 355 where the response is added to an "Action required" or "question/response required" list that keeps track of any question posed in the response message requiring an action by the originator as a request by the recipient, e.g., in order to attend the event (e.g., "Can you pick me up?). Then, the process proceeds to step 360.

At 360, FIG. 3B, a further determination is made as to whether the response message also included additional information volunteered by the recipient (e.g., "I will bring ham"). If no other additional information was included in the response message, the process can proceed to step 385, FIG. 3B in order to generate or revise the summary (if already generated) with the "affirmative" or "negatives" list findings and corresponding recipients and the action/response required based on the question. Then the process will proceed to 390, FIG. 3B to determine if this is the last recipient who sent a reply message of the determined group. Otherwise, at 360, FIG. 3B, if it is determined that the message included additional information (e.g., "I will bring ham"), then the process proceeds to step 362, where the respondent is added to an "additional information" list that keeps track of the additional information specified by the recipient in the response that may need to be categorized.

Then, the process continues at 365, FIG. 3B where the NLP natural language understanding methods are run to identify from the respondent's message any relevant "entities" and keywords in the message response that might be of interest. As an example, identified entities in a respondent's message response may be a noun or noun phrase as determined as shown underlined in the following example respondent's messages:

"I'm in! I'm bringing Casserole and my kid"

"I'll be there when I+m done making the stuffing"

"Cool! I'll bring the ham"

"I can't go, my car broke down"

In this non-limiting example, thus, the entities "casserole," "stuffing," "ham," and "car" are all examples of the "additional information" extracted by NLU, and then the system will classify them to determine the response categories. For example, at 370, FIG. 3B, the NLP natural language understanding methods are run to identify categories of entities. As a non-limiting example, the relevant extracted entities in the above example respondent's messages would be categorized as a category "food". It is understood that many categories may be identified. For example, if the initial query requested the bringing of a dish and request to bring other people, there may be two category lists maintained (e.g., "food" and "other guests").

Proceeding to 378, FIG. 3B, the system may then cluster the extracted entities using the identified categories and record the entity clusters. From the above-described example, the entities are clustered together to populate the prominent category of "food." Only "food" related entities (e.g., casserole, stuffing, ham) are clustered as being most relevant in the non-limiting example above. The entity indicating "car" and "kid" may be discarded or ignored as being extraneous to the summary. The clustering step at 378 is used to determine the most number of entities that best relates to the original question.

Further, at 375, FIG. 3B, the aggregating module 255 will begin to aggregate the results in a summary including identifying the category with the most number of entities, e.g., "food" in the example described. Aggregating module performs the work of aggregating the response and poll data for them in an easily digestible summary.

Then, at 380, FIG. 3B, the system record entities within the identified category and along with the identification of the respondent/attendee who provided the additional information with the reply.

At 385, the system generates/updates a report summary with the findings (affirmative/negative lists, question requiring a response, and or identified categories and entities for presentation to the originator (e.g., initial query sender) that is subsequently communicated to the originator via a digital text or e-mail message. The process 300 of FIGS. 3A and 3B is run continuously with every new received message response engendering a dynamically updated summary document.

As the process steps of FIGS. 3A-3B are repeated for each response received in connection with the group conversation thread, the system proceeds to 390 to determine whether all response messages from the group respondents (determined form the initial query message) have been received. If all response from the group have not all been received, then the process returns to step 302, FIG. 3A to wait for and process the next received message. Otherwise, at 390, if all responses from the group have been received, the process proceeds to 395, FIG. 3B where the report summary is automatically generated with data from the "affirmatives" list collected at step 335, the "Negatives" list collected at 340 and the "action" list with the categories and entities as recorded at 380. In an alternative embodiment, the report summary may be generated at a particular time or in response to a user request. In various embodiments, it is not essential that all responses be received prior to generating the report summary. The summary may be packaged in accordance with the originator's preferred mode of communication, e.g., e-mail or text message, as an easily digestible summary that is communicated to the originator with a clear summary with attendee information, action items as well as entities associated with the reply without having to read each respondent's reply.

Figure 4:
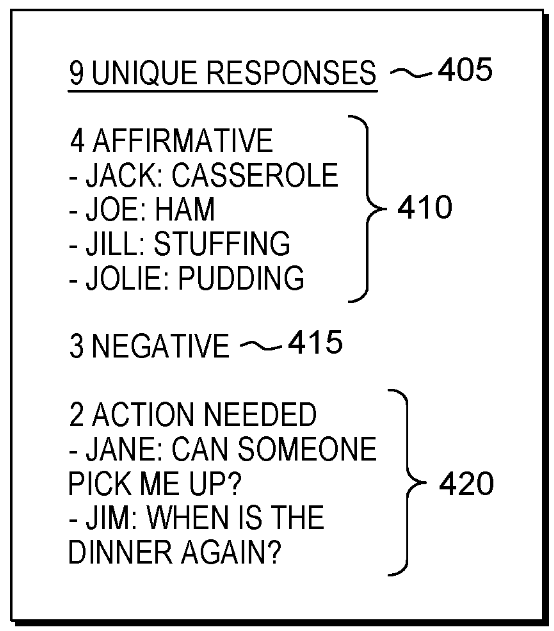
FIG. 4 depicts an example summary report displayed in an e-mail message communicated to the originator/sender of the query message in one example.

FIG. 4 depicts an example summary report displayed in an e-mail message 400 communicated to the originator/sender of the query message, e.g., based on the example respondent messages above, with the summary including the total number of respondents 405, the number of respondents 410 who have indicated an affirmative response (e.g., attending the event subject of the query), the number of respondents 415 who have indicated a negative response (e.g., not attending the event), and the action items needed 420 including the individual respondent's and their action item required as classified from the response.

In one embodiment, system 100 of FIG. 1 enables a user to quickly and easily see a summarization of a question asked from any conversation thread. The system provides the results of the question or poll asked from a conversation thread and is easily employed for advantageous use for task management of a large group, e.g., by providing such in the e-mail system clients. On top of grouping together each thread, each of the responses in a thread is analyzed and summarized as described herein without requiring not require any annotation from the sender or the participants of the email. The method analyzes an email thread to identify a certain type of conversation, e.g., an RSVP/Poll, collect multiple responses, analyzes the responses and tallying up the results to create a summary.

Figure 6:
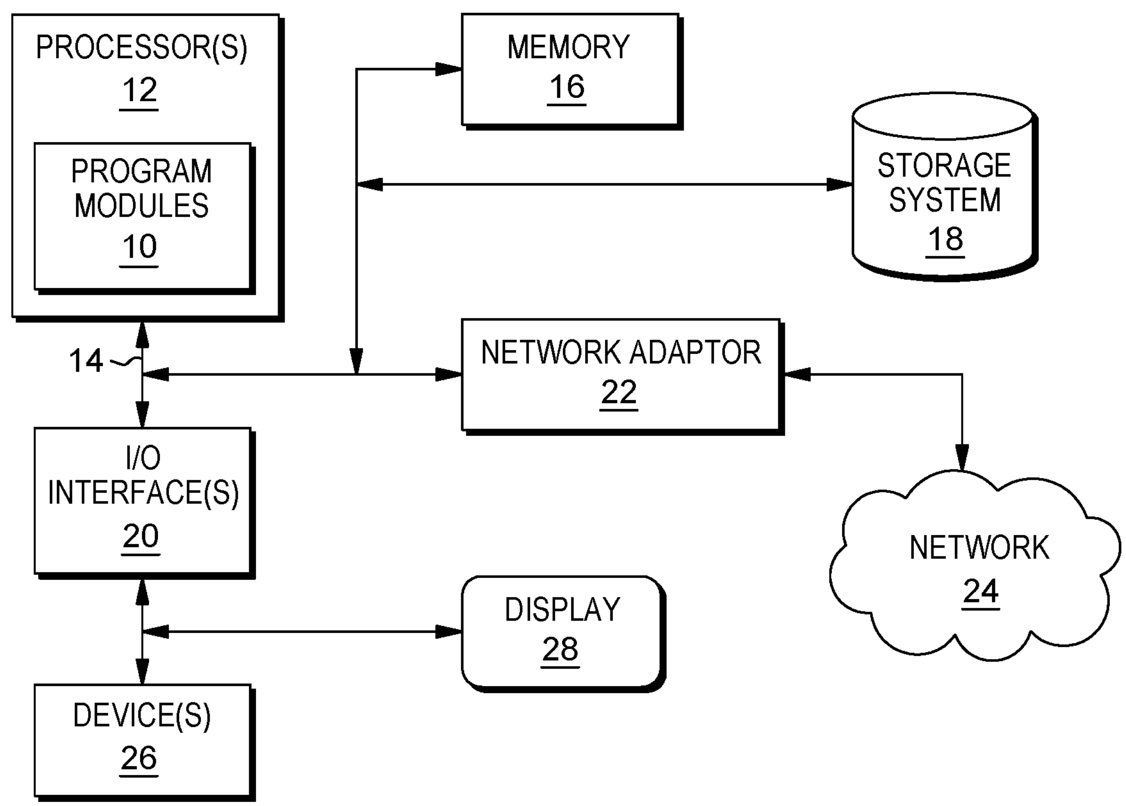
FIG. 6 depicts an exemplary system in accordance with embodiments of the present invention.

FIG. 6 illustrates an example computing system in accordance with the present invention that may provide the services and functions associated with digital group conversation summarizing operations. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 3A-3B.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a “floppy disk”), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In one embodiment, a computing system, environment, and/or configuration that may be suitable for use with the system shown in FIG. 1 include a cloud computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
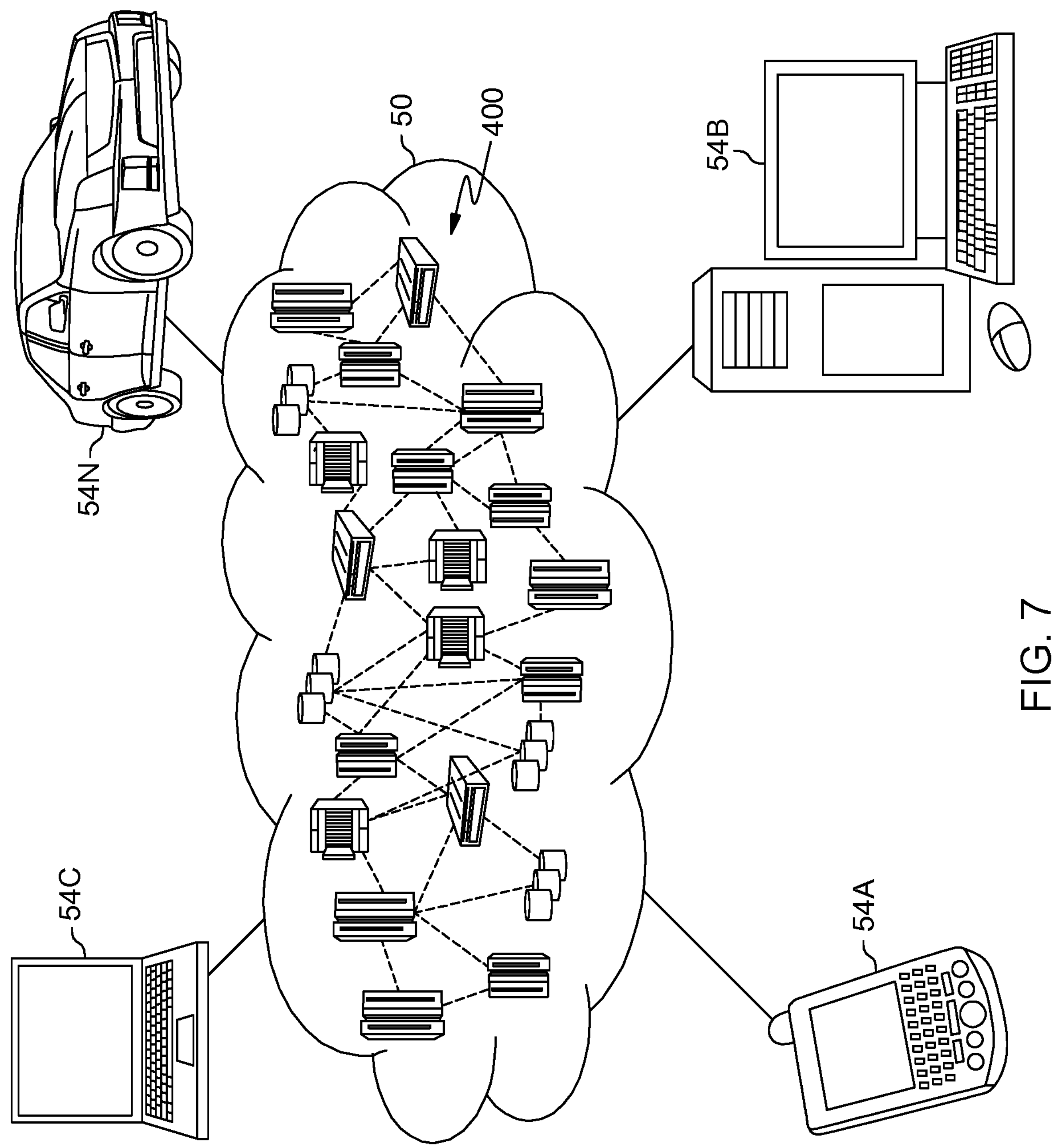
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 1000 with which local computing devices used by cloud consumers, such as, for example, personal digital assistant (PDA) or cellular telephone 54A, desktop computer 54B, laptop computer 54C, and/or automobile computer system 54N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 1000 and cloud computing environment 50 can communicate with any type of computerized device over any type of network and/or network addressable connection (e.g., using a web browser).

Figure 8:
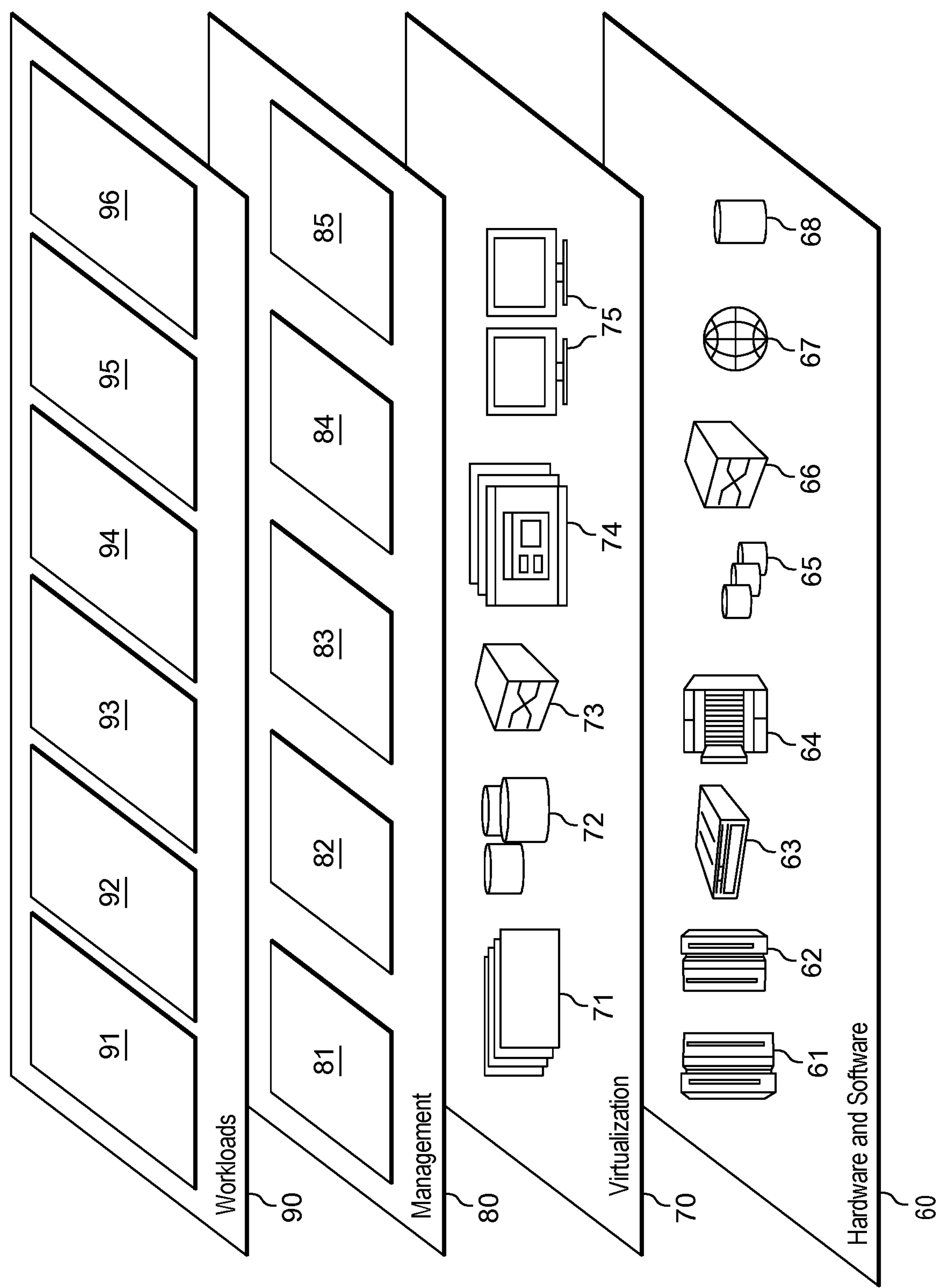
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the automated digital group conversation summary processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for summarizing information related to an event, the method comprising:

receiving, at a hardware processor of a computer system, a textual input associated with a respective user message of a plurality of second users' messages communicated over a network;

implementing, using the hardware processor of the computer system, a natural language processing of said textual content for classifying each received user's message as a response to an initial event invitation query from a first user, the event invitation query including a question requiring an answer from each of the plurality of second users recipients;

implementing using the hardware processor of the computer system, the natural language processing technique for automatically identifying keywords in each reply message received from plural second users;

implementing, using the hardware processor, a sentiment analyzer to determine a tone and extract a sentiment of a recipient's reply message, and determine based on said extracted sentiment whether that recipient will attend or will not attend;

parsing, using the hardware processor of the computer system, said textual content of the second user's reply message to identify and extract entities from said message, said extracted entities for determining whether a further action of the first user is required responsive to a question indicated in the reply message;

running, using the hardware processor, a trained natural language classification model to correlate specific entities and keywords and sentiment with a classification indicating a received reply message as an affirmative response that a second user is attending or a negative response that the second user is not attending the event and any first user actions required in response to indicated questions in the reply messages, and updating said classification model using, as training data for input to the model, correlated past and current recipient's affirmative or negative responses and any further first user action responses to indicated questions, with identified key words, sentiment and said extracted entities;

aggregating, using the hardware processor of the computer system, the indicated responses to automatically determine a number of recipients who will attend, and a number of recipients who will not attend and the further first user action responses to indicated questions;

automatically generating an output summary message comprising: a total number of replies from second users indicating attending the event including identification of the second user indicating they will attend; and a total number of replies from second users indicating they will not attend the event including identification of the second users indicating they will not attend and any further first user actions required in response to the indicated questions; and automatically communicating said generated output summary to a device associated with said first user over a communications network.

2. The computer-implemented method of claim 1, further comprising:

implementing, using the hardware processor of the computer system, the natural language processing technique for automatically identifying entities in each of the reply messages from plural second users;

determining, using the hardware processor of the computer system, a category associated with the extracted entity; and aggregating entities within said category and updating the output summary message for communication to said first user with a category and entities aggregated therein.

3. The computer-implemented method of claim 1, further comprising:

implementing, using the hardware processor of the computer system, the natural language processing technique for automatically determining whether the reply message contains a second question from the respondent.

4. The computer-implemented method of claim 1, further comprising:

maintaining, in a memory storage device, a first list of second user respondents determined as attending the event; and a second list of second user respondents determined as not attending the event; and maintaining, in a memory storage device, a third list of second user respondents and corresponding actions indicated to be performed or required to be performed.

5. A computer-implemented system for summarizing information related to an event comprising:

a memory storage device; and a hardware processor coupled to said memory storage device and configured to perform a method to:

receive a textual input associated with a respective user message of a plurality of second users' messages communicated over a network;

implement a natural language processing of said textual content for classifying each received user's message as a response to an initial event invitation query from a first user, the event invitation query including a question requiring an answer from plural second users recipients;

implement the natural language processing technique for automatically identifying keywords in each reply message received from plural second users;

implement a sentiment analyzer to determine a tone and extract a sentiment of a recipient's reply message, and determine based on said extracted sentiment whether that recipient will attend or will not attend;

parse said textual content of the second user's reply message to identify and extract entities from said message, said extracted entities for determining whether a further action of the first user is required responsive to a question indicated in the reply message;

run a trained natural language classification model to correlate specific entities and keywords and sentiment with a classification indicating a received reply message as an affirmative response that a second user is attending or a negative response that the second user is not attending the event and any first user actions required in response to indicated questions in the reply messages, and updating said classification model using, as training data for input to the model, correlated past and current recipient's affirmative or negative responses and any further first user action responses to indicated questions, with identified key words, sentiment and said extracted entities;

aggregate the indicated responses to automatically determine a number of recipients who will attend, and a number of recipients who will not attend and the further first user action responses to indicated questions;

automatically generate an output summary message comprising: a total number of replies from second users indicating attending the event including identification of the second user indicating they will attend; and a total number of replies from second users indicating they will not attend the event including identification of the second users indicating they will not attend and any further first user actions required in response to the indicated questions; and automatically communicate said generated output summary to a device associated with said first user over a communications network.

6. The computer-implemented system of claim 5, wherein said hardware processor is further configured to:

implement the natural language processing technique for automatically identifying entities in each of the reply messages from plural second users;

determine a category associated with the extracted entity; and aggregate entities within said category and updating the output summary message for communication to said first user with a category and entities aggregated therein.

7. The computer-implemented system of claim 5, wherein said hardware processor is further configured to:

implement the natural language processing technique for automatically determining whether the reply message contains a second question from the respondent.

8. The computer-implemented system of claim 5, wherein said hardware processor is further configured to:

maintain, in the memory storage device, a first list of second user respondents determined as attending the event; and a second list of second user respondents determined as not attending the event; and maintain in the memory storage device a third list of second user respondents and corresponding actions indicated to be performed or required to be performed.

9. A computer program product comprising a non-transitory, computer-readable medium comprising instructions that, when executed by at least one processor comprising hardware, configure the at least one processor to:

receive a textual input associated with a respective user message of a plurality of second users' messages communicated over a network;

implement a natural language processing of said textual content for classifying each received user's message as a response to an initial event invitation query from a first user, the event invitation query including a question requiring an answer from plural second users recipients;

implement the natural language processing technique for automatically identifying keywords in each reply message received from plural second users;

implement a sentiment analyzer to determine a tone and extract a sentiment of a recipient's reply message, and determine based on said extracted sentiment whether that recipient will attend or will not attend;

parse said textual content of the second user's reply message to identify and extract entities from said message, said extracted entities for determining whether a further action of the first user is required responsive to a question indicated in the reply message;

run a trained natural language classification model to correlate specific entities and keywords and sentiment with a classification indicating a received reply message as an affirmative response that a second user is attending or a negative response that the second user is not attending the event and any first user actions required in response to indicated questions in the reply messages, and updating said classification model using, as training data for input to the model, correlated past and current recipient's affirmative or negative responses and any further first user action responses to indicated questions, with identified key words, sentiment and said extracted entities;

aggregate the indicated responses to automatically determine a number of recipients who will attend, and a number of recipients who will not attend and the further first user action responses to indicated questions;

automatically generate an output summary message comprising: a total number of replies from second users indicating attending the event including identification of the second user indicating they will attend; and a total number of replies from second users indicating they will not attend the event including identification of the second users indicating they will not attend and any further first user actions required in response to the indicated questions; and automatically communicate said generated output summary to a device associated with said first user over a communications network.

10. The computer program product according to claim 9, further comprising instructions to:

implement the natural language processing technique for automatically identifying entities in each of the reply messages from plural second users;

determine a category associated with the extracted entity; and aggregate entities within said category and updating the output summary message for communication to said first user with a category and entities aggregated therein.

11. The computer program product of claim 9, further comprising instructions to:

implement the natural language processing technique for automatically determining whether the reply message contains a second question from the respondent.

12. The computer program product of claim 9, further comprising instructions to:

maintain, in the memory storage device, a first list of second user respondents determined as attending the event; and a second list of second user respondents determined as not attending the event; and maintain in the memory storage device a third list of second user respondents and corresponding actions indicated to be performed or required to be performed.

* * * * *